S. L. DENNEY.
Cane Mill.
No. 2,759. Reissued Sept. 3, 1867
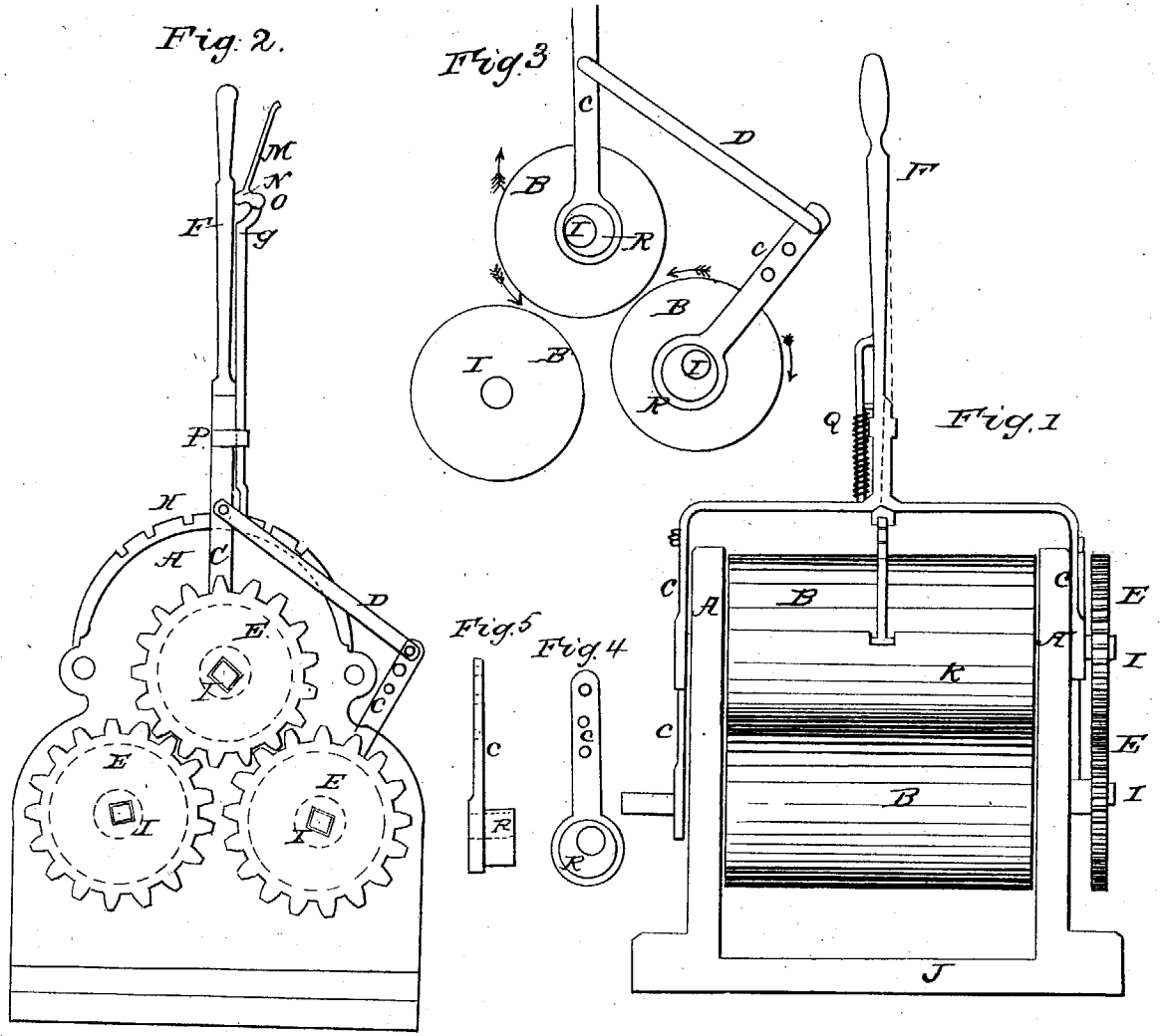
N. PETERS, Photo-Lithographer, Washington, D. C.

United States Patent Office.

SAMUEL L. DENNEY, OF CHRISTIANA, PENNSYLVANIA.

*Letters Patent No.* 21,601, *dated September* 28, 1858; *reissue No.* 2,759, *dated September* 3, 1867.

IMPROVEMENT IN SUGAR-CANE MILLS.

The Schedule referred to in these Letters Patent and making part of the same.

TO ALL WHOM IT MAY CONCERN:

Be it known that I, S. L. DENNEY, of Christiana, in the county of Lancaster, and State of Pennsylvania, have invented a new and improved Sorghum-Mill; and I do hereby declare that the following is a full and exact description thereof, reference being had to the accompanying drawings, and to the letters of reference marked thereon.

This invention consists in eccentric boxes for the journals of cylinders in sorghum and other crushing-mills, said boxes being provided with arms, and the arms of the two boxes at the opposite ends of the upper cylinder being curved and extended so as to meet each other above the centre of the cylinder, and form when again bent upward a lever for use in partially rotating the boxes, as hereinafter fully described.

To enable those skilled in the art to make and use my invention, I will now proceed to describe its construction and operation.

A represents the frame of the mill in which the cylinders are placed, and to which the juice-pan is firmly secured, said frame being constructed in the usual way. Two bars *k* are extended across the upper part of the mill, which serve to brace the frame and support the ends of the arch H. In the said frame circular apertures are made to receive the journals I I′ I″ of the cylinders B B′ B″. The journals I I′ are set at the sides instead of at the centres of their respective boxes R R′, so that the latter are eccentric with regard to the said journals. Arms *c* project in a vertical plane from boxes J in which the boxes R rest. The arms *c*, after extending upward sufficiently far to clear the top of the frame, are bent inward and brought together about over the centre of the cylinder B, when they are both again bent upward and form the lever F. On the protruding ends of the journals I is fitted the spur-gearing E E E, by means of which motion is communicated to all the cylinders. Connected to the lever F is a sliding-bolt, *g*, which is held in its proper position by the guard P, and works upon a pivot at the lower end of the hand-piece M. Said hand-piece is also secured by a pivot, *o*, to lever F. H represents an arch, the ends of which are attached to the bars *k* about at the centre thereof. The crown of the arch comes about up to the lower end of the lever F. The arch is provided with a suitable notch, *h*, into which the bolt *g* enters, being held therein by the springs 2. It will be perceived that by grasping the handle of the lever F at the same time with the hand-piece M, and drawing the latter towards the former, the bolt *g* will be lifted from that notch of the arch H in which it may chance to be resting. There will then be nothing to hinder the rotation of the boxes R by means of the lever F, the arms *c*, and the boxes J. The boxes J being set firmly in the frames A, will, if rotated in the direction of the arrow, effect the introduction of the thicker parts of the boxes R under the journals I, and thus cause them to be raised, whereby the cylinder B will be made to recede from the two lower cylinders. The reverse of this operation will of course cause the upper cylinder to approach the others, a perfect parallelism between the rollers being all the time preserved.

By means of this arrangement the mill can at any time, even while in motion, be instantly adjusted to any degree of proximity that may be necessary to secure a thorough expression of the juices from canes of all sizes. In mills of ordinary construction the smaller stalks are either not effectually crushed or there is an unnecessary consumption of power in crushing the larger ones. In case, as often happens, the mill is "stalled" by allowing too much cane to get into it, instant relief can be given by causing the upper cylinder to recede from the others until they are enabled to resume their motion. When the cylinders are made to approach each other closely the spurs of the gearing project correspondingly deeper between each other, whereby the gearing is made to act most powerfully when the greatest power is needed.

Another important function of the eccentric boxes is to compensate for loss by the friction of the journals on the bearings. Portions of the boxes having been worn away, and the distance between the cylinders thereby increased, this mischief may be repaired by shifting round the lower boxes, which are held in place by a ring or set-screw. This shifting is independent of that effected by the lever F, and restores the cylinders exactly to their former positions with respect to each other. Cylindrical boxes could not effect this result as they can only compensate for their own losses from friction. The losses of the journals, from the same cause, they cannot compensate for. But eccentric boxes compensate for the losses both of themselves and the journals.

Having thus fully described my invention, what I claim as new, and desire to secure by Letters Patent, is—

1. Eccentric boxes when used to support the journals of shafts or cylinders for the purpose of effecting compensation for the wearing away of the journals and bearings, substantially as described.

2. The eccentric boxes R, in combination with the arms *c c* and the lever F, as for the purpose set forth.

S. L. DENNEY.

Witnesses:

H. DENNEY,

WILLIAM H. DENNEY.